March 26, 1968
M. MANES
3,374,608
SILVER IMPREGNATED CARBON
Filed Aug. 30, 1966
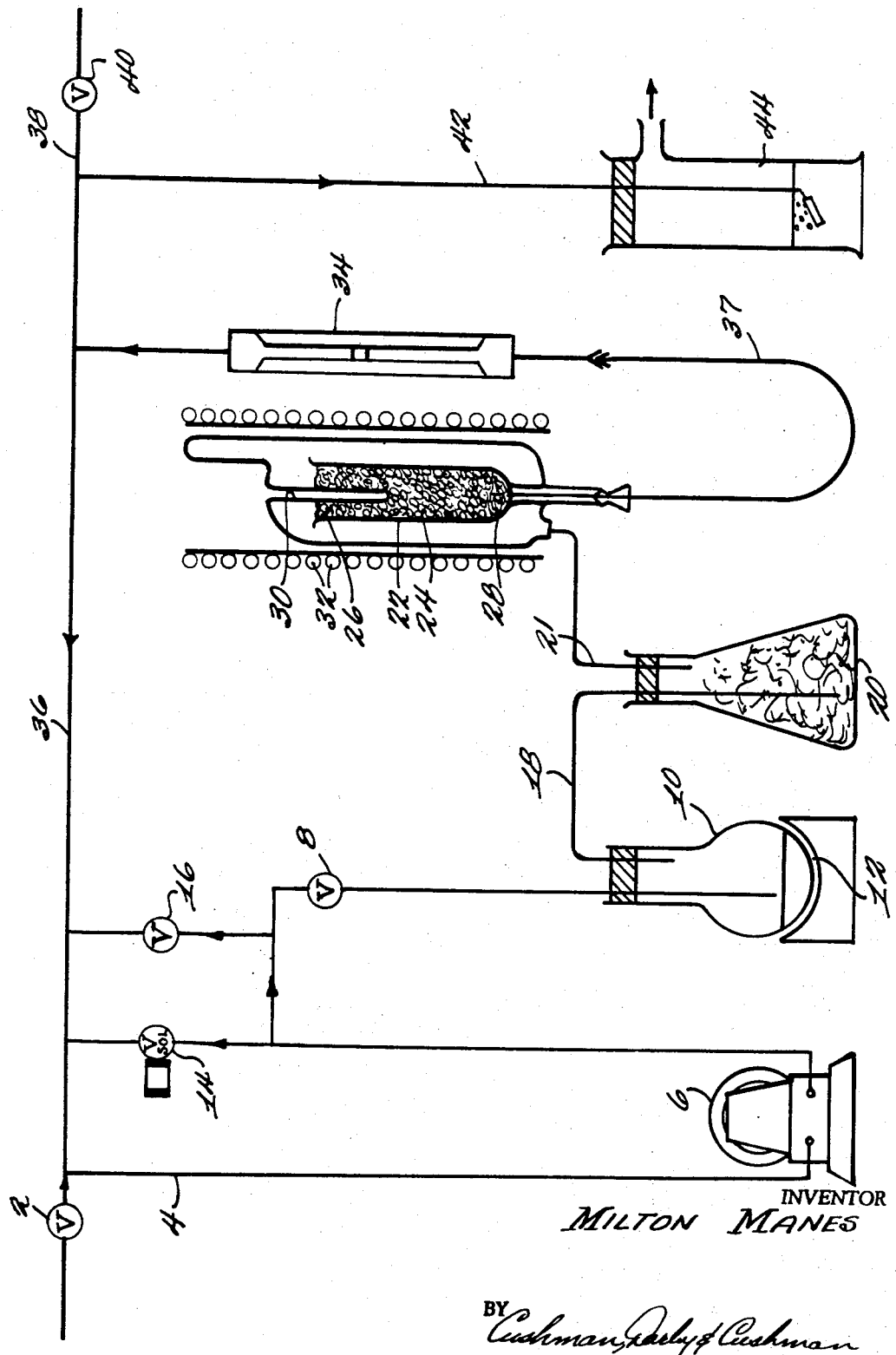
INVENTOR
MILTON MANES
BY
Cushman, Darby & Cushman
ATTORNEYS

United States Patent Office 3,374,608
Patented Mar. 26, 1968

3,374,608
SILVER IMPREGNATED CARBON
Milton Manes, Pittsburgh, Pa., assignor to Pittsburgh Activated Carbon Company, Pittsburgh, Pa., a corporation of Pennsylvania
Filed Aug. 30, 1966, Ser. No. 575,989
6 Claims. (Cl. 55—72)

ABSTRACT OF THE DISCLOSURE

A process for removing mercury from a gas stream contaminated with mercury by passing the gas stream containing mercury over an activated carbon impregnated with a metallic silver having a crystallite size of not over 250 A. The metallic silver is formed by reducing a silver thiocyanate complex impregnated on the activated carbon.

---

The present invention relates to the preparation of silver impregnated activated carbon.

Activated carbon, suitably impregnated with silver, efficiently removes mercury vapor from gases, e.g. see Manes Patent 3,193,987, July 13, 1965. A properly prepared silver-impregnated carbon should be regeneratable, e.g. by heating to 300–400° C., the mercury being vaporized and recovered. However, not all silver-impregnated carbons are equally efficient.

The impregnation of activated carbon with silver presents some special problems, since activated carbon is a sufficiently strong reducing agent to reduce the silver ions in solution to metallic silver, the silver being deposited in the form of coarse crystals which are not effective, for example, for the rapid removal of mercury. The premature reduction of the silver ions can be circumvented by pre-oxidation of the activated carbon with nitric acid or by using a sufficiently high concentration of nitric acid in the impregnating solution to keep the silver dissolved. This procedure has several disadvantages. In the first place the pretreatment of the activated carbon by nitric acid adds to the overall cost of the product. A second, and more serious, disadvantage is that activated carbon containing substantial amounts of silver nitrate, with or without additional nitric acid, frequently undergoes violent spontaneous ignition on drying. This ignition results from the oxidizing effect of silver nitrate on activated carbon.

Consequently, it has been found that it is not commercially feasible to employ silver nitrate to get silver impregnated activated carbon. While the hazards of an explosive reaction are reduced by keeping the silver loading from silver nitrate down to 5% on activated carbon, there is still some danger even at this level.

In an attempt to develop an activated carbon which was suitable for mercury removal, many materials were tried. One of the prerequisites of a suitable activated carbon for mercury removal, e.g. from hydrogen, is that it can go through numerous cycles of adsorption and regeneration. Thus, silver impregnated activated carbon should be able to go through several hundred cycles of adsorption and regeneration. Furthermore, for proper efficiency, the silver must be dispersed as particles of colloidal size (less than 250 A. in crystallite size measured by X-ray diffraction line broadening).

The use of a colloidal solution of reduced silver as an impregnating agent was attempted by trying argyrol (a commercially available colloidal silver stabilizer with albumin). The high cost of this material precludes its commercial use. Furthermore, it was not possible to satisfactorily regenerate the activated carbon after mercury removal. Silver lactate was also tried as an impregnating agent for activated carbon followed by reduction to free silver. When tested for mercury adsorption the product had an initial breakthrough time of between 20 and 24 hours at 5400 space velocity. Its saturation capacity was 28% Hg/Ag. Breakthrough was immediate after regeneration, the corresponding effective saturation capacity was 10% Hg/Ag. It was unsatisfactory for commercial use in removal of mercury from hydrogen and other gases.

Silver cyanide was also tried as an impregnant for the activated carbon but was ineffective because of the large crystallite size (400–500 A.) of the silver formed. Furthermore, due to the toxicity of the cyanides involved, its use is not attractive for large scale commercial operation.

Employing copper impregnated activated carbon proved to be completely ineffective to remove mercury from air, nitrogen or hydrogen, while activated carbon impregnated with manganese dioxide removed mercury from hydrogen, but the capacity was completely lost on regeneration.

Accordingly, it is an object of the present invention to develop a novel silver impregnated activated carbon.

Another object is to develop a silver impregnated activated carbon effective for removal of mercury from gases.

An additional object is to prepare such a silver impregnated activated carbon by a process which does not involve safety hazards in its preparation.

A further object is to develop such a silver impregnated activated carbon which can be regenerated hundreds of times after its use for mercury removal from gases.

A still further object is to prepare a silver impregnated activated carbon having a high silver content.

Yet another object is to prepare a silver impregnated activated carbon having a high capacity for mercury.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by impregnation of the activated carbon with a silver-thiosulfate complex. The product can be stored in this form and sold as such, or it can be reduced immediately to form free silver. Since the primary use of the free silver impregnated carbon is to remove mercury vapor from hydrogen, the preferred reducing agent is an atmosphere of hydrogen. However, any other reducing atmosphere can be used, e.g. carbon monoxide.

The preferred sources of thiosulfate are sodium thiosulfate and potassium thiosulfate. Less preferably, ammonium thiosulfate can be used. Excess thiosulfate can be used, but this is not necessary. Any convenient soluble silver compound can be used as a source of silver to form the thiosulfate complex. Thus, there can be used silver oxide, silver carbonate or soluble and slightly soluble silver salts, such as silver acetate and silver chloride. Alternatively, there can be used preformed silver thiosulfate which can then be dissolved in water containing sufficient additional thiosulfate ion. Preferably silver nitrate is avoided as a silver source to avoid the problems encountered when large amounts of nitrate are available with silver impregnated activated carbon.

It has been found that when activated carbon is impregnated with a solution of silver thiosulfate complex followed by reduction of the combined silver to metallic silver, that the metallic silver has a crystallite size of not over 250 A. and in many cases is from 100 to 150 A.

It has been found that the activated carbon can be loaded with 2 grams of silver metal per gram of activated carbon. Normally, however, there is no need to go beyond a loading of 1 gram of silver metal for 1 gram of activated carbon.

As little silver as 1% by weight of the activated carbon can be used, e.g. in purifying gases containing acetylene to avoid a high concentration of silver acetylide. However, for most uses, at least 5% of silver metal based on the weight of the activated carbon is employed. Thirty percent of silver metal can also be employed.

The silver impregnated carbon formed in the present invention is suitable to remove mercury vapors from gases, such as hydrogen, carbon dioxide, oxygen, air and nitrogen.

The activated carbon is normally impregnated with aqueous silver thiosulfate at room temperature and then dried at either room or elevated temperature. It is then reduced to metallic silver by hydrogen (or other reducing agent) at an elevated temperature, e.g. 400° C., although lower temperatures, such as 300° C. or 350° C., can be employed.

The metallic silver impregnated carbon thus formed has proven excellent as an activated carbon suitable for removal of mercury vapors from hydrogen (or other atmosphere).

The metallic silver impregnated carbon of the present invention has been found to successfully remove mercury from gas streams. The product has an excellent adsorption power for the mercury. The product was then subjected to a temperature of 300-400° C. to desorb the mercury removal and this activity is maintained after reactivated carbon to its original activity. It has been found that this treatment gives a product with high activity for mercury removal and this activity is maintained after repeated cycles of adsorption and regeneration for the equivalent of a year's service with no evidence of failure. For best results the regeneration temperature should not be over 350° C. Temperatures above 400° C. cause accelerated deterioration of the activated carbon by sintering. Regeneration should be at a temperature of at least 300° C. in order to remove the mercury in vapor form.

It has further been found that mercury removal from hydrogen gas is not impaired by the presence of water vapor in equilibrium with saturated sodium chloride brine. The single figure of the drawings is a schematic diagram of apparatus suitable for measuring mercury adsorption.

Unless otherwise indicated, all parts and percentages are by weight.

*Example 1*

2.2. grams of silver oxide ($Ag_2O$) and 10 grams of sodium thiosulfate pentahydrate ($Na_2S_2O_3 \cdot 5H_2O$) were dissolved in 20 cc. of water. A very small amount of the silver oxide, probably free silver, did not go into solution and was filtered off. The filtrate, 30 ml. in volume, was sprinkled in a sample of 40 grams of activated carbon (Pittsburgh BPL, 4 x 10 mesh). The resulting product was moist but had no excess liquid. The sample was dried overnight at 110° C. in an oven.

The thus impregnated activated carbon was reduced in a stream of hydrogen at 400° C. with evolution of $H_2S$ and sulfur vapors. The crystallite size of the metallic silver formed on the carbon was determined by X-ray diffraction line broadening to be in the range of 100 to 150 A. This is the smallest particle size thus far observed with a silver-impregnated carbon. As previously pointed out, the smaller the size of the silver particles the more effective it is for rapid removal of mercury.

Unless otherwise indicated, the metallic silver-impregnated activated carbon employed in the following examples was that prepared in Example 1.

*Example 2*

A suitable apparatus for measuring mercury adsorption is shown in the figure wherein hydrogen gas is admitted through valve 2 into line 4 and thence through gas circulating pump 6 and valve 8 to mercury saturator 10 containing mercury 12. There is also provided a solenoid valve 14 and bypass valve 16.

The saturator is heated to 50–100° C. so that mercury vapor will be entrained in the hydrogen. (At such elevated temperatures mercury has a significant vapor pressure.) The hydrogen-containing entrained mercury vapor is passed via line 18 through scrubber 20 filled with glass wool to remove non-gaseous materials. Then the hydrogen with entrained mercury goes via line 21 to adsorption or sample tube 22. The sample tube 22 is filled with granular activated carbon 24 and is provided with glass wool plugs 26 and 28 at the top and bottom and also with a thermowell 30. Surrounding the adsorption or sample tube there is provided a heater 32. The heater is not operated during adsorption but is operated when regeneration of the activated carbon is desired. Flow rates of the hydrogen are determined by a Rotameter flow meter 34. Adsorption tube 22 and Rotameter 34 are attached by ground glass joints to condenser 36. Thus the hydrogen gas after passing through adsorption tube 22, where the mercury vapor is removed, passes through condenser 37 and thence through Rotameter 34. A portion of the hydrogen gas is recycled via line 36 to pump 6. Another portion of the hydrogen gas is sent through line 38 and valve 40 to a gas detector (not shown) where the concentration of mercury in the exit gas is measured. The detector comprised a small reagent tube which developed a characteristic color on reaction with mercury.

Finally, a portion of the hydrogen is purged via line 42 and buffer vent 44.

The amount of mercury pickup was determined by the weight of mercury recovered on regeneration in tube 36. It was not possible to accurately determine the mercury pickup by the increase in weight of the impregnated carbon in adsorption tube 22 because water vapor is also adsorbed and contributes to the increase in weight.

The procedure employed involved weighing a sample of the silver-impregnated activated carbon into the adsorption or sample tube 22. The entire system was purged with hydrogen gas. (In some cases the sample tube did not contain the silver in reduced form but contained the silver thiosulfate complex impregnated on the activated carbon. In such cases the tube 22 was heated to 400° C., while passing hydrogen therethrough without access to mercury so that the silver thiosulfate was reduced to metallic silver. The tube 22 was then allowed to cool to room temperature. The results are the same whether the silver thiosulfate is reduced to metallic silver in this manner or if the silver thiosulfate-impregnated carbon has the silver thiosulfate reduced prior to being placed in tube 22.)

After the tube 22 having metallic silver impregnated activated carbon therein was in position and following the purge of the system with hydrogen, the mercury saturator 10 was heated to 50–100° C., e.g. 75° C., and circulation of hydrogen was begun with the sample tube 22 at room temperature, while a continuous bleed of hydrogen was maintained to vent.

Rate of adsorption of mercury vapor was investigated by determining the breakthrough of mercury at a space velocity of 6,000 per hour (on liter per minute for a 5-gram impregnated activated carbon sample), the hydrogen gas containing 25 mg. per cubic meter of mercury. In this test the mercury vapor did not break through until at least 24 hours of testing. The mercury capacity on 24 hours exposure at saturation vapor pressure was determined at a space velocity of 30,000 per hour. Mercury was removed from the saturated sample after exposure by heating to 350° C. or 400° C. in hydrogen at one liter per minute (for convenient condensation). The mercury released was collected in a U-tube condenser 37 at room temperature and weighed. The silver impregnated activated carbon withstood repeated cycles of heating to 350° C. and re-absorption of mercury.

As has been pointed out previously, the recovery of mercury vapor by silver impregnated carbon is not an economical process unless the impregnant can withstand at least several hundred cycles of adsorption and regeneration, corresponding to at least one year of operation. A life test was designed with the objective of (a) automatically subjecting the sample to repeated cycles of adsorption and regeneration, (b) exposing the entire sample to mercury vapor, and (c) accelerating the normal process. The system described diagrammatically in this example was equipped with an automatic repeat-cycle timer that was set for 1.5 hours adsorption and 0.5 hour heating for regeneration. The hydrogen flow rate was raised to 5 liters per minute during adsorption and in place of using a 5 gram activated carbon sample, the sample size was reduced to 2 to 2.5 grams. The hydrogen flow rate was reduced to one liter per minute during regeneration by solenoid valve 14 in the circulating pump 6 bypass, also under the control of the timer. The reduction in sample size and the increase in flow rate were for the purpose of increasing the space velocity and thereby exposing all of the sample to mercury vapor. The reduction in flow rate during regeneration was for convenience in condensation. This reduction in flow rate was subsequently found to be unnecessary.

Life testing was interrupted periodically to run saturation capacity tests of the impregnant.

The effect of moisture in the hydrogen stream was investigated by testing the breakthrough of a silver impregnated activated carbon sample with saturated sodium chloride brine in the scrubber 20.

*Example 3*

At a space velocity of 11,000 per hour a 2.78 gram sample of the silver impregnated activated carbon prepared in Example 1 had a breakthrough time of 19–26 hours, using the apparatus and method of Example 2. The breakthrough point was that point at which the hydrogen effluent through valve 40 had 1 mg. of mercury per cubic meter.

The effective saturation capacity of the impregnated carbon was 55 grams of mercury per 100 grams of metallic silver. This compares with an effective saturation capacity of metallic silver impregnated activated carbon prepared from silver nitrate of 30 grams of mercury per 100 grams of metallic silver. The saturation capacity is even lower if the metallic silver is prepared from argyrol or silver lactate.

*Example 4*

Example 3 was repeated at a space velocity of 6,000, using a 2.006 gram sample of the silver impregnated activated carbon of Example 1. The breakthrough time to 1 mg. of mercury per cubic meter of hydrogen was 6.5 hours after 386 cycles, wherein the regeneration was at 400° C.

*Example 5*

Life testing of the silver impregnated activated carbon of Example 1 was carried out with the apparatus and method of Example 2 and employing a regeneration temperature of 400° C. The effective saturation capacity of the impregnated carbon initially was 55 grams of mercury per 100 grams of silver. After 35 cycles this was reduced to 32 grams of mercury per 100 grams of silver, still a very good capacity. After 145 cycles, the capacity was 35 grams of mercury per 100 grams of silver and after 386 cycles the capacity was 36 grams of mercury per 100 grams of silver. This is equivalent to over a year of actual service.

As set forth in Example 4 in the rate test at 6,000 per hour space velocity, the mercury broke through in 6.5 hours after the 386 cycles, as compared with about 20 hours for the original material at 11,000 per hour, indicating some deterioration. The 400° C. regeneration temperature employed represented an intentionally severe test. At a lower regeneration temperature, i.e. at 300 to 350° C., this deterioration does not occur and years of effective life are possible.

While Pittsburgh BPL 4 x 10 mesh activated carbon (made as described in Tabor Patent 2,763,580) was used in the examples, other activated carbon can also be employed in varying particle sizes, e.g. between 4 and 60 mesh. Examples of other suitable activated carbons are Pittsburgh CAL, Pittsburgh SGL, Columbia activated carbon Grade SXAC and Darco activated carbon.

What is claimed is:

1. A process of removing mercury from a gas contaminated with the same comprising passing the gas over activated carbon impregnated with metallic silver having a crystallite size of not over 250 A. formed by reducing silver thiosulfate complex impregnated on said carbon.

2. A process according to claim 1 wherein the gas is selected from the group consisting of air, hydrogen, carbon dioxide, nitrogen and oxygen.

3. A process according to claim 2 wherein the gas is hydrogen.

4. A process according to claim 3 wherein the activated carbon is regenerated by heating at 300–400° C. and re-employed for mercury removal at least 145 times.

5. A process according to claim 4 wherein the heating is at 300–350° C.

6. A process according to claim 5 wherein the regeneration is carried out at least 386 times.

References Cited

UNITED STATES PATENTS 2,511,289  6/1950  Morrell et al. _____ 252—438
3,193,987  7/1965  Manes _____ 55—72

OTHER REFERENCES

Thorne, et al., Inorganic Chemistry, Interscience Publishers, Inc., N.Y., 1949, pp. 258 and 259. (Copy in Group 176).

REUBEN FRIEDMAN, *Primary Examiner.*

C. N. HART, *Assistant Examiner.*

UNITED STATES PATENT OFFICE
CERTIFICATE OF CORRECTION

Patent No. 3,374,608                  March 26, 1968

Milton Manes

It is certified that error appears in the above identified patent and that said Letters Patent are hereby corrected as shown below:

Column 1, line 68, "stabilizer" should read -- stabilized --. Column 3, lines 34 and 35, "removal and this activity is maintained after retivated" should read -- therefrom and restore the silver impregnated activated --. Column 4, line 66, "on" should read -- one --.

Signed and sealed this 14th day of October 1969.

(SEAL)
Attest:

Edward M. Fletcher, Jr.                 WILLIAM E. SCHUYLER, JR.
Attesting Officer                        Commissioner of Patents